United States Patent
You et al.

(10) Patent No.: US 12,470,056 B2
(45) Date of Patent: Nov. 11, 2025

(54) MODULAR SURGE PROTECTION DEVICE (SPD)

(71) Applicant: XIAMEN SET ELECTRONICS CO., LTD., Xiamen (CN)

(72) Inventors: Lianqiao You, Xiamen (CN); Xianggui Zhang, Xiamen (CN); Anping Cao, Xiamen (CN)

(73) Assignee: XIAMEN SET ELECTRONICS CO., LTD., Xiamen (CN)

( * ) Notice: Subject to any disclaimer, the term of this patent is extended or adjusted under 35 U.S.C. 154(b) by 111 days.

(21) Appl. No.: 18/034,406

(22) PCT Filed: Aug. 13, 2021

(86) PCT No.: PCT/CN2021/112580
§ 371 (c)(1),
(2) Date: Apr. 28, 2023

(87) PCT Pub. No.: WO2022/142365
PCT Pub. Date: Jul. 7, 2022

(65) Prior Publication Data
US 2024/0006870 A1    Jan. 4, 2024

(30) Foreign Application Priority Data
Dec. 29, 2020    (CN) .......................... 202023231240.2

(51) Int. Cl.
*H02H 3/20*        (2006.01)
*H02H 9/04*        (2006.01)
(52) U.S. Cl.
CPC ................ *H02H 3/20* (2013.01); *H02H 9/04* (2013.01)

(58) Field of Classification Search
CPC ... H02H 3/20; H02H 9/04; H02H 9/06; H01C 7/126; H01H 37/08; H01H 2037/762; H01H 37/761; H01T 1/14; H01T 4/04
USPC ......................................................... 361/91.1
See application file for complete search history.

(56) References Cited

U.S. PATENT DOCUMENTS 9,906,017 B2 * 2/2018  Tsovilis ................. H01C 1/022

FOREIGN PATENT DOCUMENTS

| CN | 107611949 | A |   | 1/2018  |             |
|----|-----------|---|---|---------|-------------|
| CN | 207234392 | U |   | 4/2018  |             |
| CN | 207426686 | U |   | 5/2018  |             |
| CN | 208062787 | U |   | 11/2018 |             |
| CN | 208299436 | U | * | 12/2018 | ........... H01H 37/761 |
| CN | 209267172 | U |   | 8/2019  |             |
| CN | 110556810 | A | * | 12/2019 | ............ H02H 9/041 |
| CN | 210490455 | U | * | 5/2020  | ........... H01H 37/761 |
| CN | 211209291 | U | * | 8/2020  | ............... H01C 7/12 |

(Continued)

*Primary Examiner* — Sreeya Sreevatsa
(74) *Attorney, Agent, or Firm* — Bayramoglu Law Offices LLC

(57) ABSTRACT

A modular surge protection device (SPD) is provided. The modular SPD includes an overvoltage protection component, and a trip mechanism for disconnecting the SPD, where the overvoltage protection component is provided with a pin electrode; the overvoltage protection component includes a voltage switching element; and the trip mechanism is provided on the voltage switching element. The SPD can ensure no action of the trip mechanism in response to a surge in a high-temperature environment, and does not affect the action time of the trip mechanism in response to an abnormal overcurrent.

10 Claims, 4 Drawing Sheets

(56) References Cited

FOREIGN PATENT DOCUMENTS

CN          211830200 U    10/2020
EP           3086330 A1    10/2016

\* cited by examiner

MODULAR SURGE PROTECTION DEVICE (SPD)

CROSS REFERENCE TO THE RELATED APPLICATIONS

This application is the national phase entry of International Application No. PCT/CN2021/112580, filed on Aug. 13, 2021, which is based upon and claims priority to Chinese Patent Application No. 202023231240.2, filed on Dec. 29, 2020, the entire contents of which are incorporated herein by reference.

TECHNICAL FIELD

The present disclosure relates to the technical field of electronic and electrical equipment, and in particular, to a modular surge protection device (SPD).

BACKGROUND

For an existing mechanical-tripping SPD combined with a voltage limiting element and a voltage switching element, a trip mechanism is provided on the voltage limiting element. When a surge occurs in a system, the SPD is connected immediately to limit the overvoltage within a safe working range of the device, the voltage limiting element produces heat, and no action of the trip mechanism is allowed. When an abnormal overcurrent occurs in the system, both the voltage limiting element and the voltage switching element produce a large amount of heat and the trip mechanism is disconnected immediately to prevent fire and other hazards of the SPD. When the SPD works in a high-temperature environment of 95° C. and the power system suffers from the surge, a low-temperature alloy of the trip mechanism is fused easily for heat production of the voltage limiting element and the environmental temperature. In this case, the melting point of the alloy is improved. However, with the higher melting point of the alloy, the trip mechanism has a longer action time in response to the abnormal overcurrent. This will aggravate the fire hazard of the SPD.

SUMMARY

In view of defects in the prior art, a technical problem to be solved by the present disclosure is to provide a modular SPD, so as to ensure no action of the trip mechanism in response to a surge of the power system in a high-temperature environment, and not to affect action time of the trip mechanism in response to an abnormal overcurrent in the prior art.

To solve the above technical problems, the technical solutions adopted by the present disclosure are as follows:

A modular SPD includes an overvoltage protection component, and a trip mechanism for disconnecting the SPD, where the overvoltage protection component is provided with a pin electrode; the overvoltage protection component includes a voltage switching element; and the trip mechanism is provided on the voltage switching element.

Further, the overvoltage protection component includes a mounting frame; a slot and two chutes are formed in the mounting frame; the slot is positioned between the two chutes; the voltage switching element is provided in the slot; the trip mechanism includes a spring electrode, a pressure spring, and an arc-shielding slider; the spring electrode is provided at a side of the slot and connected to the voltage switching element; the arc-shielding slider is provided at an opposite side of the spring electrode and abuts against the spring electrode; the pressure spring is provided between the arc-shielding slider and the spring electrode; and the arc-shielding slider is slidably provided in the chutes.

Further, the spring electrode is connected to the voltage switching element with a low-temperature alloy.

Further, the modular SPD includes a voltage limiting element, where the voltage limiting element is a varistor, and the voltage switching element is a gas discharge tube.

Further, the modular SPD further includes an overvoltage protection unit for connecting the varistor and the gas discharge tube, where the overvoltage protection unit includes a varistor frontside electrode, a varistor backside electrode, and a gas discharge tube electrode; the gas discharge tube is provided on the varistor; the varistor frontside electrode is provided between the gas discharge tube and the varistor; the varistor backside electrode is provided under the varistor; and the gas discharge tube electrode is provided on the gas discharge tube.

Further, an insulating layer is coated on a surface of the overvoltage protection unit.

Further, the insulating layer may be a silicone rubber layer or an epoxy resin encapsulated layer.

Further, the overvoltage protection component includes a first overvoltage protection component and a second overvoltage protection component that are structurally identical; the first overvoltage protection component and the second overvoltage protection component are stacked; and a varistor frontside electrode of the first overvoltage protection component is docked with a spring electrode of the second overvoltage protection component.

Further, the modular SPD includes an upper shell and a lower shell that can be fastened to each other, where the first overvoltage protection component and the second overvoltage protection component are respectively arranged in the lower shell and the upper shell; and a through hole for allowing the pin electrode to pass through is formed in the lower shell.

Further, the arc-shielding slider is provided with a color label; a window is formed in the upper shell; and the window corresponds to the color label on the arc-shielding slider.

The present disclosure has the following advantages:

According to the modular SPD provided by the present disclosure, the trip mechanism is provided on the voltage switching element. In response to a surge, the voltage limiting element produces heat, while the voltage switching element basically does not produce heat. The heat is transferred through the voltage switching element from the voltage limiting element to the trip mechanism. Consequently, the heat transferred to the trip mechanism is reduced, and the heat transferred to the trip mechanism in a high-temperature environment does not cause fusion of the low-temperature alloy. In response to an overcurrent, a heating amount of the voltage switching element is several times a heating amount of the voltage limiting element. Therefore, the trip mechanism on the voltage switching element is more favorable for an action of the trip mechanism.

DETAILED DESCRIPTION OF THE EMBODIMENTS

Figure 1:
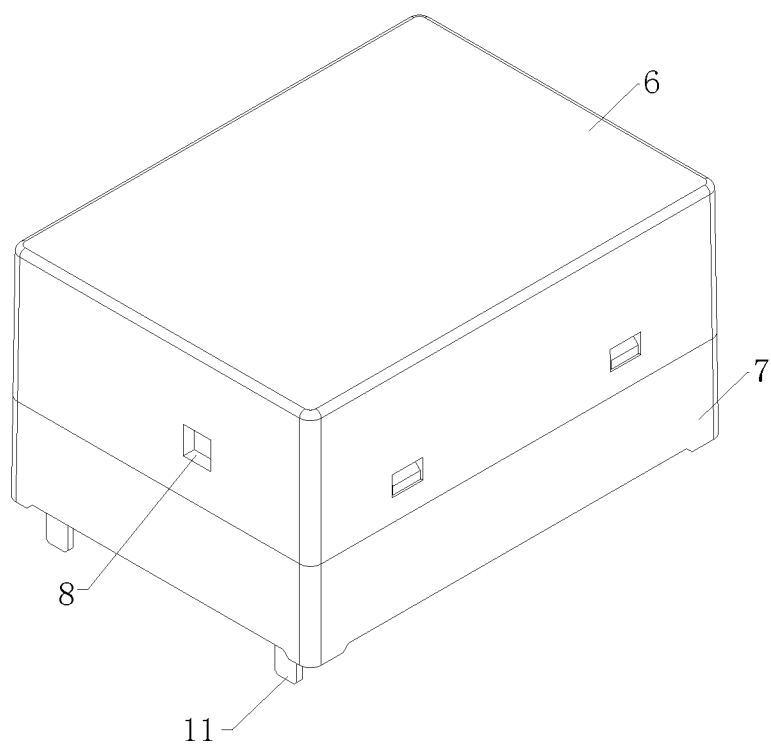
FIG. 1 is a structural schematic view of a modular SPD according to the present disclosure.

For a detailed description of the technical contents, objectives, and effects in the present disclosure, the present disclosure is described below with reference to implementations and accompanying drawings.

Referring to FIG. 1 to FIG. 7, the present disclosure provides a modular SPD, including overvoltage protection component 1, and trip mechanism 2 for disconnecting the SPD. The overvoltage protection component 1 is provided with pin electrode 11. The overvoltage protection component 1 includes voltage limiting element 12, and voltage switching element 13. The trip mechanism 2 is provided on the voltage switching element.

Figure 4:
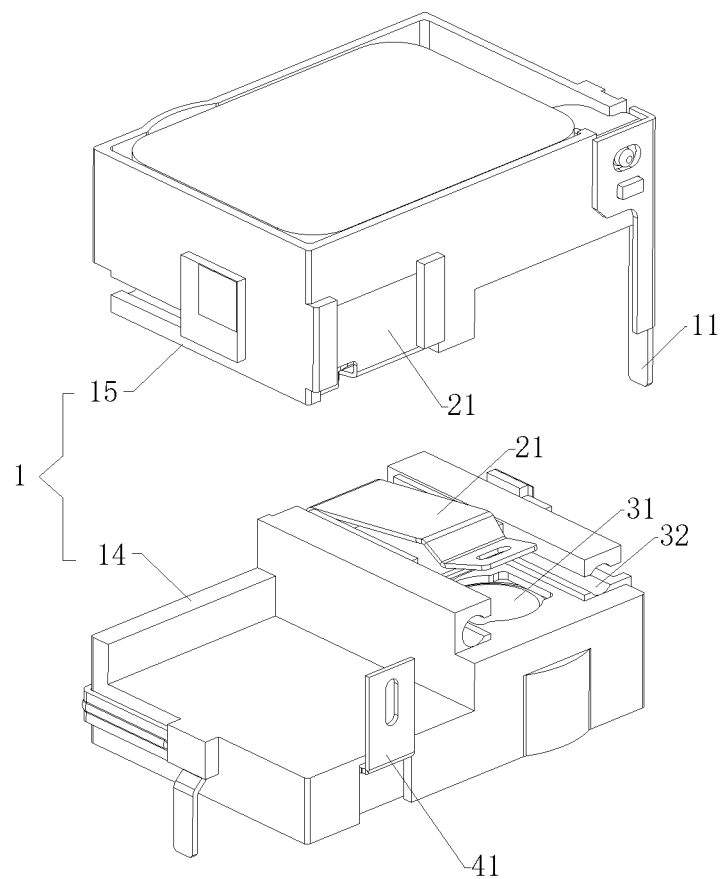
FIG. 4 is an internal exploded view of a modular SPD according to the present disclosure.
Figure 5:
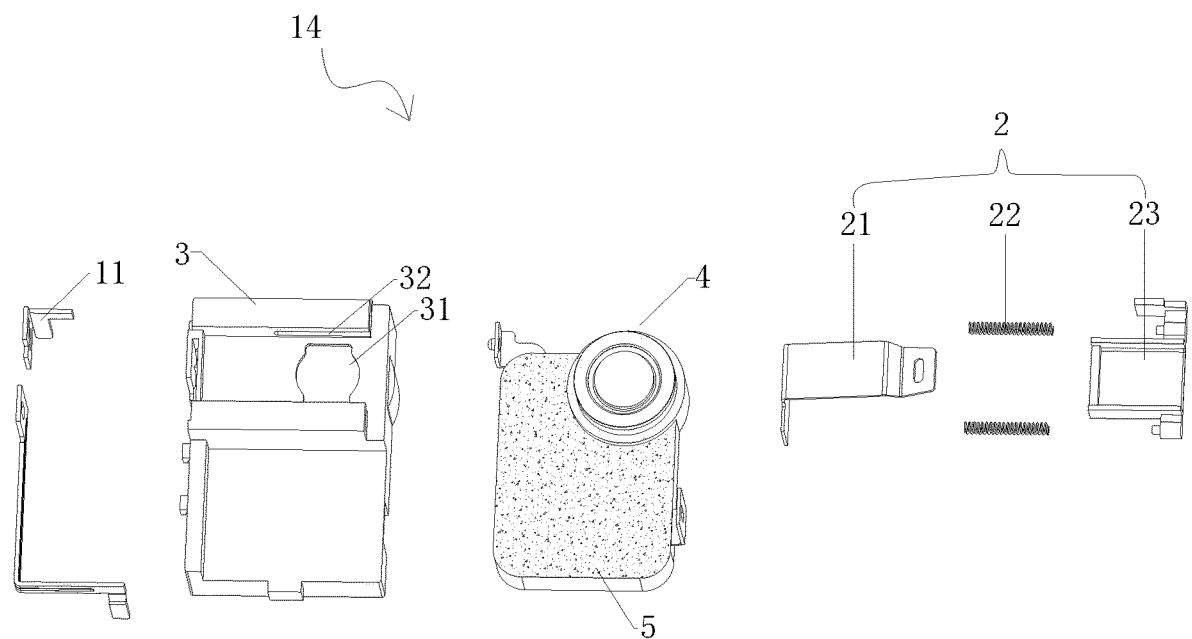
FIG. 5 is an exploded view of a first overvoltage protection component of a modular SPD according to the present disclosure.
Figure 6:
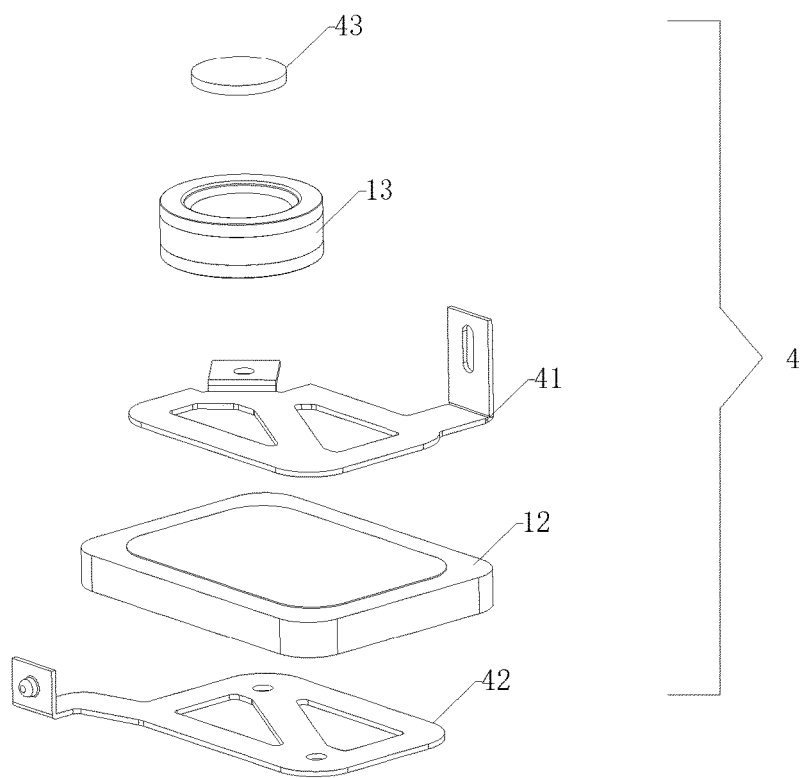
FIG. 6 is an exploded view of a first overvoltage protection unit of a modular SPD according to the present disclosure.
Figure 7:
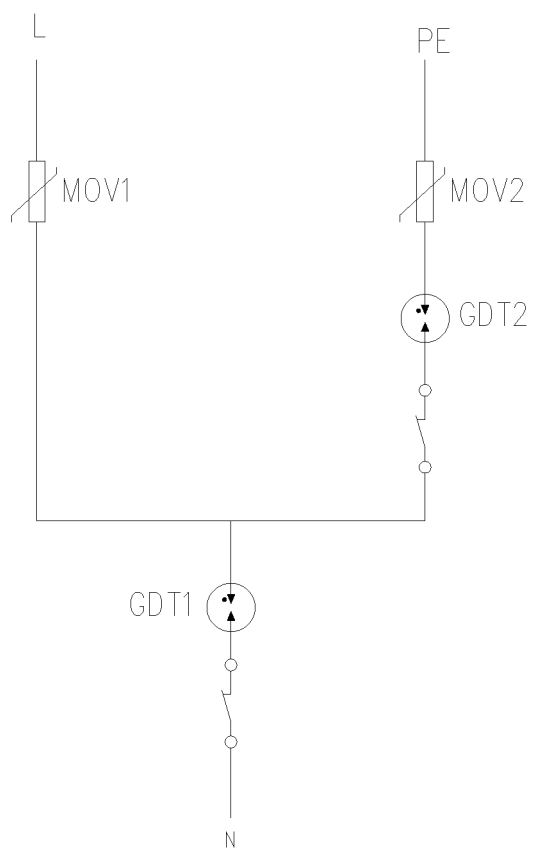
FIG. 7 is a schematic circuit diagram of a modular SPD according to the present disclosure.

Referring to FIG. 4 to FIG. 6, the trip mechanism 2 in the present disclosure is specifically mounted as follows: The overvoltage protection component 1 includes mounting frame 3. Slot 31 and two chutes 32 are formed in the mounting frame 3. The slot 31 is positioned between the two chutes 32. The voltage switching element 13 is provided in the slot 31. The trip mechanism 2 includes spring electrode 21, pressure spring 22, and arc-shielding slider 23. The spring electrode 21 is provided at a side of the slot 31 and connected to the voltage switching element 13 with a low-temperature alloy. The arc-shielding slider 23 is provided at an opposite side of the spring electrode 21 and abuts against the spring electrode 21. The pressure spring 22 is provided between the arc-shielding slider 23 and the spring electrode 21. The arc-shielding slider 23 is slidably provided in the chutes 32. In response to an abnormal overcurrent of the SPD, the low-temperature alloy is fused, and the arc-shielding slider 23 slides along the chutes 32 in the mounting frame 3 under an action of the pressure spring 22. As a result, the spring electrode 21 is isolated from gas discharge tube electrode 43 of an overvoltage protection unit to protect the SPD. In the embodiment, the low-temperature alloy may be Sn63Pb37, Sn-2.5Ag-1.0Bi-0.5Cu, or Sn64.7-Bi35-Ag0.3.

Referring to FIG. 5 and FIG. 6, the voltage limiting element 12 is a varistor, and the voltage switching element 13 is a gas discharge tube. The present disclosure further includes overvoltage protection unit 4 for connecting the varistor and the gas discharge tube. The overvoltage protection unit 4 includes varistor frontside electrode 41, varistor backside electrode 42, and gas discharge tube electrode 43. The gas discharge tube is provided on the varistor. The varistor frontside electrode 41 is provided between the gas discharge tube and the varistor. The varistor backside electrode 42 is provided under the varistor. The gas discharge tube electrode 43 is provided on the gas discharge tube. According to the technical solution, the gas discharge tube is provided on the varistor, and connected to the varistor through the varistor frontside electrode 41. With the varistor frontside electrode 41, the connected bottom of the gas discharge tube does not contact the varistor, such that a current of the whole overvoltage protection component 1 is flowed more uniformly.

Referring to FIG. 5, an insulating layer 5 is coated on a surface of the overvoltage protection unit 4. The insulating layer 5 may be a silicone rubber layer or an epoxy resin encapsulated layer. The insulating layer 5 can increase an insulating strength in the SPD.

Referring to FIG. 3 to FIG. 6, the overvoltage protection component 1 includes first overvoltage protection component 14 and second overvoltage protection component 15 that are structurally identical. The first overvoltage protection component 14 and the second overvoltage protection component 15 are stacked. Varistor frontside electrode 41 of the first overvoltage protection component 14 is docked with spring electrode 21 of the second overvoltage protection component 15. Since the first overvoltage protection component 14 and the second overvoltage protection component 15 are stacked, two overvoltage protection units 4 are isolated to weaken mutual influence between the two heating voltage limiting elements 12, and prolong a service life of the SPD.

Referring to FIG. 1 to FIG. 4, the modular SPD in the present disclosure further includes upper shell 6 and lower shell 7 that can be fastened to each other. The first overvoltage protection component 14 and the second overvoltage protection component 15 are respectively arranged in the lower shell 7 and the upper shell 6. A through hole for allowing the pin electrode 11 to pass through is formed in the lower shell 7. With the shells, not only can the overvoltage protection component 1 be protected, but the structure of the SPD can also be more compact.

Figure 2:
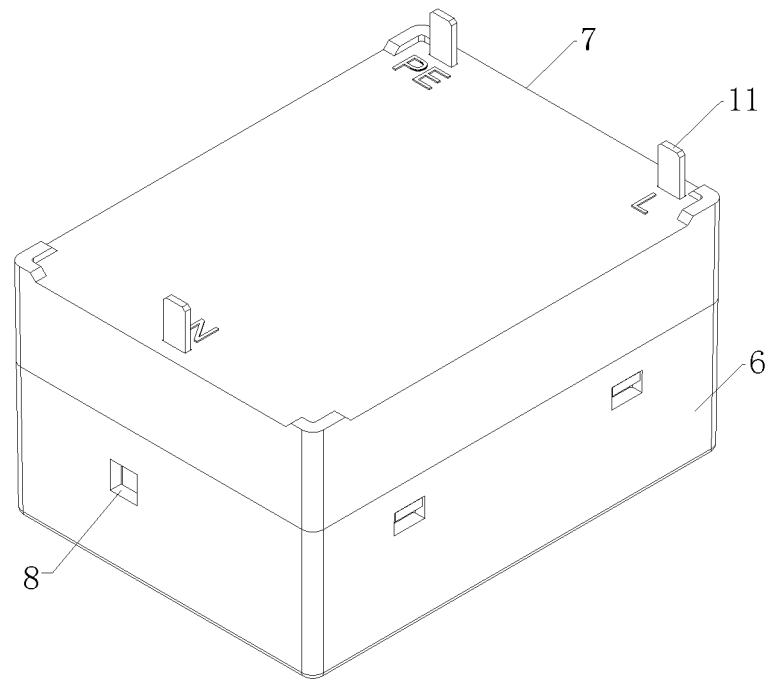
FIG. 2 is a structural schematic view of a modular SPD according to the present disclosure.
Figure 3:
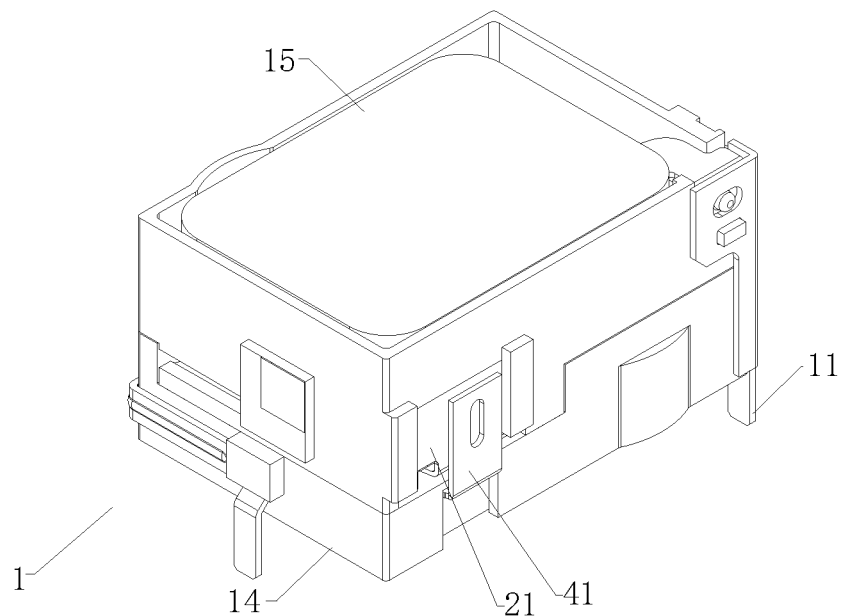
FIG. 3 is a structural schematic view when an outer housing of a modular SPD is removed according to the present disclosure.

Referring to FIG. 1 and FIG. 2, window 8 is formed in the upper shell 6. The window 8 corresponds to a color label on the arc-shielding slider. The arc-shielding slider is provided with the color label. The window 8 cooperates with an indication of the internal arc-shielding slider. The trip mechanism 2 can give a color indication once tripped. Specifically, it turns green normally and turns red once tripped.

In conclusion, according to the modular SPD provided by the present disclosure, the trip mechanism is provided on the voltage switching element. In response to a surge, the voltage limiting element produces heat, while the voltage switching element basically does not produce heat. The heat is transferred through the voltage switching element from the voltage limiting element to the trip mechanism. Consequently, the heat transferred to the trip mechanism is reduced, and the heat transferred to the trip mechanism in a high-temperature environment does not cause fusion of the low-temperature alloy. In response to an overcurrent, a heating amount of the voltage switching element is several times a heating amount of the voltage limiting element. Therefore, the trip mechanism on the voltage switching element is more favorable for an action of the trip mechanism.

The foregoing are merely embodiments of the present disclosure and do not constitute a limitation on the scope of the present disclosure. Any equivalent change made by using the description and the accompanying drawings of the present disclosure or direct or indirect application thereof in related technical fields shall still fall in the protection scope of the patent of the present disclosure.

The term "one embodiment", "embodiment" or "one or more embodiments" mentioned herein means that a specific feature, structure, or characteristic described in combination with the embodiment is included in at least one embodiment of the present disclosure. In addition, it should be noted that the phrase example "in an embodiment" herein does not necessarily refer to the same embodiment.

In the specification provided herein, a large quantity of specific details are described. However, it can be understood that the embodiments of the present disclosure can be practiced without these specific details. In some embodiments, well-known methods, structures, and techniques are not shown in detail to avoid obscuring the understanding of this specification.

What is claimed is:

1. A modular surge protection device (SPD), comprising an overvoltage protection component, and a trip mechanism for disconnecting the SPD, wherein the overvoltage protection component is provided with a pin electrode; the overvoltage protection component comprises a voltage switching element; and the trip mechanism is directly located on the voltage switching element.

2. The modular SPD according to claim 1, wherein the overvoltage protection component comprises a mounting frame; a slot and two chutes are formed in the mounting frame; the slot is positioned between the two chutes; the voltage switching element is provided in the slot; the trip mechanism comprises a spring electrode, a pressure spring, and an arc-shielding slider; the spring electrode is provided at a side of the slot and connected to the voltage switching element; the arc-shielding slider is provided at an opposite side of the spring electrode and abuts against the spring electrode; the pressure spring is provided between the arc-shielding slider and the spring electrode; and the arc-shielding slider is slidably provided in the chutes.

3. The modular SPD according to claim 2, wherein the spring electrode is connected to the voltage switching element with a low-temperature alloy.

4. The modular SPD according to claim 2, further comprising a voltage limiting element, wherein the voltage limiting element is a varistor, and the voltage switching element is a gas discharge tube.

5. The modular SPD according to claim 4, further comprising an overvoltage protection unit for connecting the varistor and the gas discharge tube, wherein the overvoltage protection unit comprises a varistor frontside electrode, a varistor backside electrode, and a gas discharge tube electrode; the gas discharge tube is provided on the varistor; the varistor frontside electrode is provided between the gas discharge tube and the varistor; the varistor backside electrode is provided under the varistor; and the gas discharge tube electrode is provided on the gas discharge tube.

6. The modular SPD according to claim 5, wherein an insulating layer is coated on a surface of the overvoltage protection unit.

7. The modular SPD according to claim 6, wherein the insulating layer is a silicone rubber layer or an epoxy resin encapsulated layer.

8. The modular SPD according to claim 5, wherein the overvoltage protection component comprises a first overvoltage protection component and a second overvoltage protection component that are structurally identical; the first overvoltage protection component and the second overvoltage protection component are stacked; and a varistor frontside electrode of the first overvoltage protection component is docked with a spring electrode of the second overvoltage protection component.

9. The modular SPD according to claim 8, further comprising an upper shell and a lower shell that are fastened to each other, wherein the first overvoltage protection component and the second overvoltage protection component are respectively arranged in the lower shell and the upper shell; and a through hole for allowing the pin electrode to pass through is formed in the lower shell.

10. The modular SPD according to claim 9, wherein the arc-shielding slider is provided with a color label; a window is formed in the upper shell; and the window corresponds to the color label on the arc-shielding slider.

* * * * *